(12) United States Patent
Chai

(10) Patent No.: US 7,069,610 B1
(45) Date of Patent: Jul. 4, 2006

(54) THERAPEUTIC MATTRESS

(76) Inventor: Chang-Wei Chai, No. 568, Jhongjheng Rd., Caotun Township, Nantou County 542 (TW)

( * ) Notice: Subject to any disclaimer, the term of this patent is extended or adjusted under 35 U.S.C. 154(b) by 0 days.

(21) Appl. No.: 11/122,485

(22) Filed: May 4, 2005

(51) Int. Cl.
*A47C 27/00* (2006.01)
*G01G 19/52* (2006.01)

(52) U.S. Cl. .................. 5/731; 5/715; 5/719; 5/693; 177/144

(58) Field of Classification Search .............. 5/900.5, 5/933, 935, 943, 693, 719, 731, 715, 239, 5/241, 258
See application file for complete search history.

(56) References Cited

U.S. PATENT DOCUMENTS

| | | | | |
|---|---|---|---|---|
| 4,542,547 A | * | 9/1985 | Sato | ............... 5/713 |
| 5,060,326 A | * | 10/1991 | Oswald | ............... 5/236.1 |
| 5,192,304 A | * | 3/1993 | Rassman | ............... 606/238 |
| 5,446,933 A | * | 9/1995 | Gabelhouse | ............... 5/670 |
| 6,487,738 B1 | * | 12/2002 | Graebe | ............... 5/719 |
| 6,721,981 B1 | * | 4/2004 | Greenhalgh et al. | ............ 5/716 |
| 6,829,797 B1 | * | 12/2004 | Partian | ............... 5/713 |

* cited by examiner

*Primary Examiner*—Michael Trettel
(74) *Attorney, Agent, or Firm*—Charles E. Baxley

(57) ABSTRACT

A therapeutic mattress, inside which are arranged with plurality of sensors which are disposed on the lifting-and-supporting assemblies, and a control system is used to control the lifting-and-supporting assemblies and the sensors, through rise and fall of the lifting-and-supporting assemblies, the therapeutic mattress can be adjusted to support different body parts of the patient. The control system and the sensors can cooperate with each other to provide a precise function of weight-measurement and body-position sensing, and the sensors will cooperate with lifting-and-supporting assemblies to adjust the supporting point of the therapeutic mattress to the patient, thus preventing bedsores.

1 Claim, 6 Drawing Sheets

THERAPEUTIC MATTRESS

BACKGROUND OF THE INVENTION

1. Field of the Invention

The present invention relates to a therapeutic mattress, and more particularly to a therapeutic mattress that can precisely can measure the patient's weight precisely and enable the medical people to monitor the condition of the patient easily at all times, furthermore, the therapeutic mattress can prevent bedsores effectively.

2. Description of the Prior Arts

Modern medicine is laying more and more stress on quality of medical treatment, and a patient lying on bed for an overlong time also needs to be measured and monitored at all times, therefore, how to make a device that can sense the condition of a patient easily will obviously become the mainstream design of future therapeutic equipments.

Nowadays, most of the therapeutic mattresses are provided with sensors at the lateral sides thereof, and few of them dispose the sensors inside the mattress. However, using such conventional therapeutic mattresses will be very inconvenient both for medical people and the patient who needs to lying on bed for a long time, due to the following problems:

First, as for a patient in a coma, or a disabled people confined to bed, a simple action of moving or changing a bed cannot be done without assistance, and even the simplest action of sitting up will be quite difficult to achieve. However, weight-measurement still needs to be done very day since it is import to medical treatment. The current method of weight measurement is that several medical peoples work together to move the patient to a weight machine and then move she/he back to the bed afterwards. This weight measurement is not only a time-consuming and laborsome work for the medical people, but also may hurt the patient.

Second, as for a patient in a coma, or a disabled people confined to bed, body measurement (height, width and size of the patient) either cannot be done without assistance, therefore, precision of the measuring results will be limited.

Third, disabled people confined to bed is most afraid of bedsores, so every patient must be massaged and changed in body position very day, this is not only a hard work for medical people but also will not adversely affect the recovery of the patient.

The present invention has arisen to mitigate and/or obviate the afore-described disadvantages.

SUMMARY OF THE INVENTION

The primary objective of the present invention is to provide a therapeutic mattress that can precisely can measure the patient's weight precisely and enable the medical people to monitor the condition of the patient easily at all times, in the housing of the mattress are provided with a plurality of sensors.

The secondary objective of the present invention is to provide a therapeutic mattress that can prevent bedsores effectively, among the lifting-and-supporting assemblies in the housing are arranged a plurality of sensors that are able to measure the weight of the patient applied on the lifting-and-supporting assemblies. A control system serves to receive data sending from the respective sensors and calculate based on designed program and provide calculation result for medical people, the control system is further able to control rise-and-fall of the respective lifting-and-supporting assemblies.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
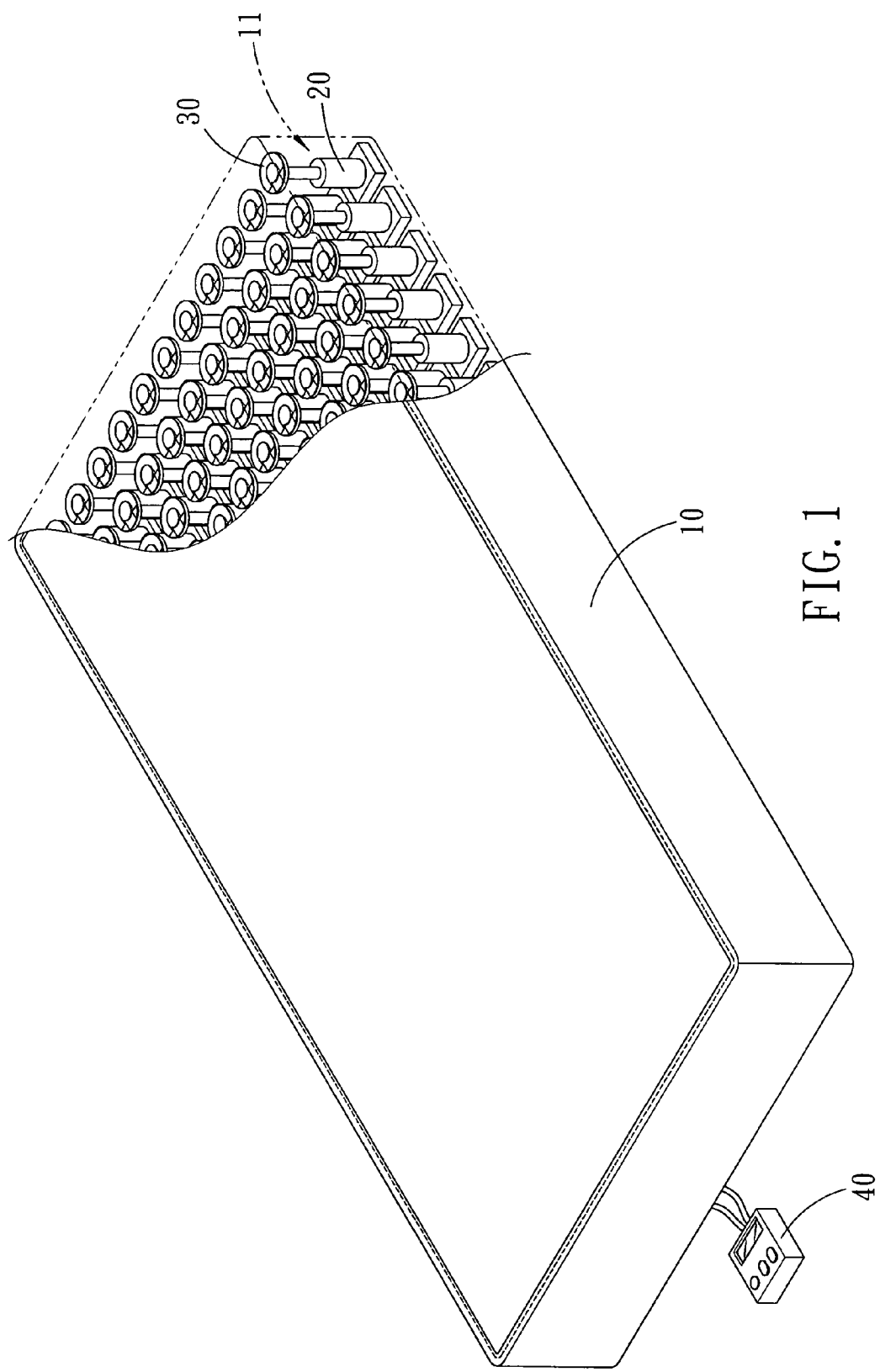
FIG. 1 is a partial perspective view of a therapeutic mattress in accordance with the present invention.
Figure 2:
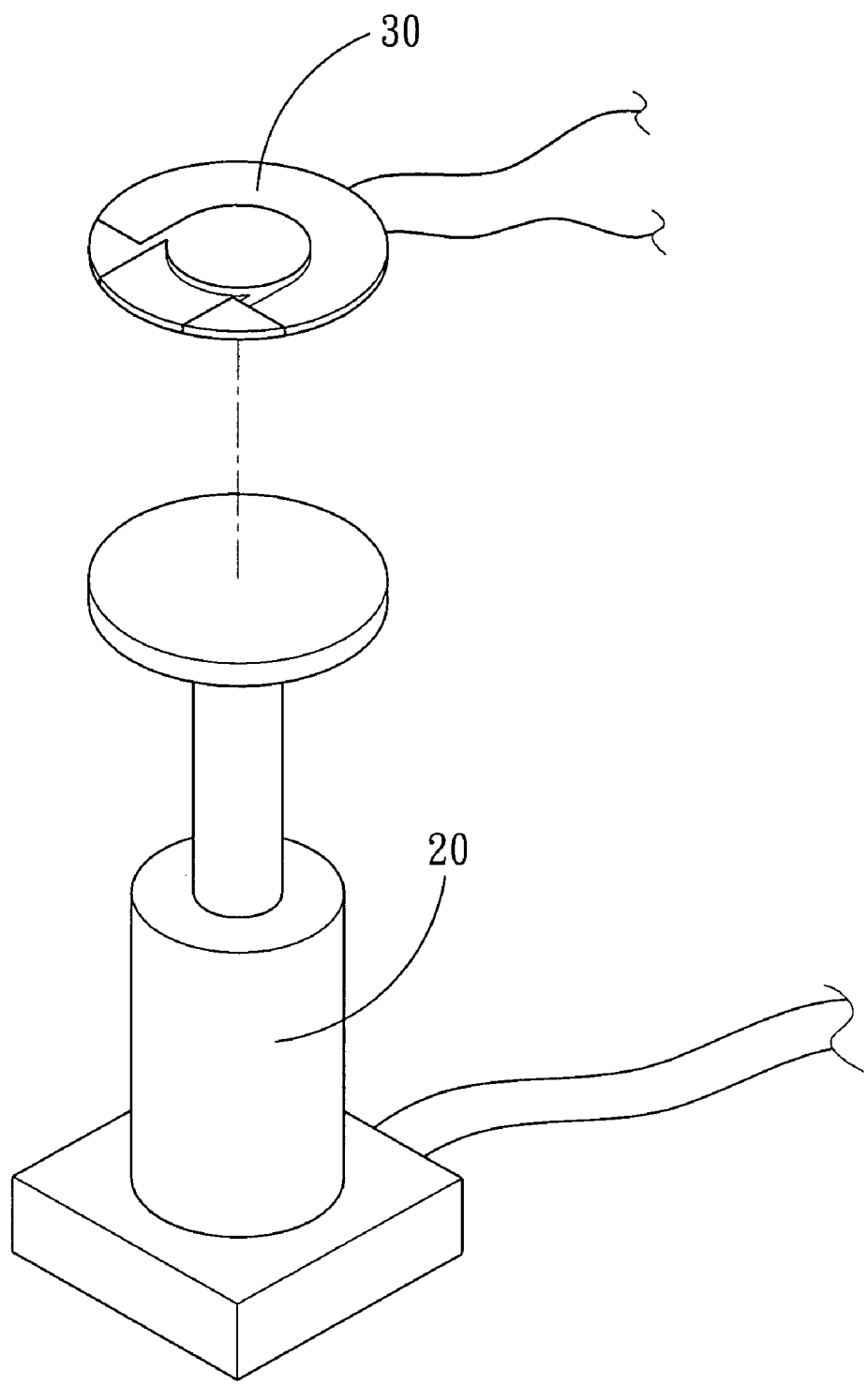
FIG. 2 is a perspective view of a sensor and a lifting-and-supporting assembly of the therapeutic mattress in accordance with the present invention.
Figure 3:
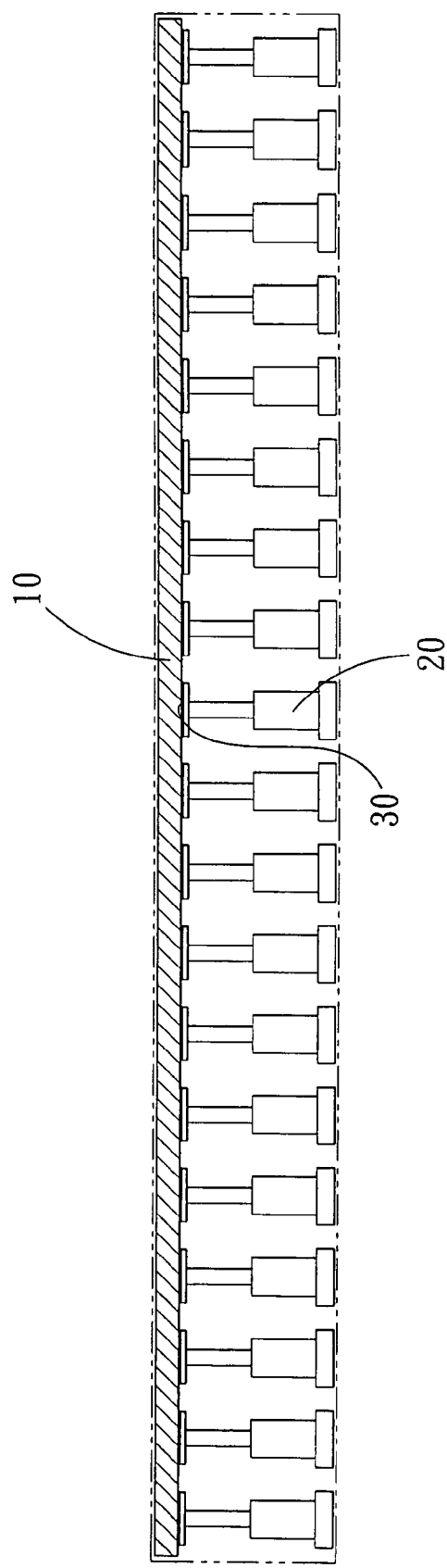
FIG. 3 is a cross sectional view of the therapeutic mattress in accordance with the present invention.

Referring to FIGS. 1–4, a therapeutic mattress in accordance with the present invention is shown and comprises: a housing 10, a plurality of lifting-and-supporting assemblies 20, a plurality of sensors 30 and a control system 40.

The housing 10 is interiorly provided with a receiving space 11.

The plurality of lifting-and-supporting assemblies 20 are arranged in the receiving space 11 of the housing 10 and are able to rise and fall under control. The lifting-and-supporting assemblies 20 cooperate with one another to stably support the patient 50 lying on the housing 10, and in this embodiment, the lifting-and-supporting assemblies 20 take the form of hydraulic pressure system.

The plurality of sensors 30 are disposed among the lifting-and-supporting assemblies 20 in the housing 10 and able to measure the weight of the patient 50 applied on the lifting-and-supporting assemblies 20, in this embodiment, the sensors 30 take the form of piezo-electric element.

The control system 40 serves to receive the data sending from the respective sensors 30 and can calculate based on designed program and provide calculation result for the medical people. The control system 40 is further able to control the rise-and-fall of the respective lifting-and-supporting assemblies 20.

Figure 4:
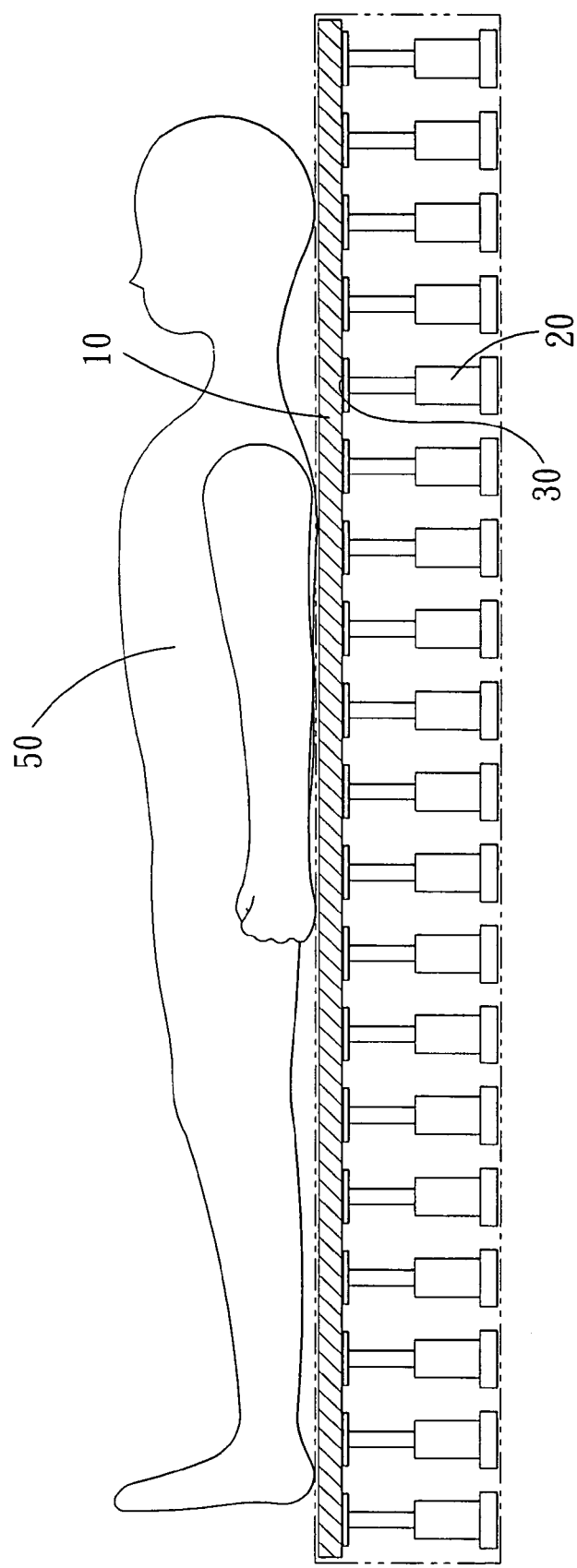
FIG. 4 is an operational view of the therapeutic mattress in accordance with the present invention.

With reference to FIG. 4, when lying on the housing 10, the patient 50 will be firmly supported by the respective lifting-and-supporting assemblies 20 that are located in the receiving space 11 of the housing 10, and now the sensors 30 among the lifting-and-supporting assemblies 20 start to measure the weight of the patient 50 pressed on the lifting-and-supporting assemblies 20. Finally, the data obtained by the sensors 30 will be sent to and calculated by the control system 40. Therefore, the device of the present invention can measure the patient's weight precisely and enable the medical people to monitor the condition of the patient easily at all times.

Furthermore, since the sensors 30, the lifting-and-supporting assemblies 20 are arranged in the receiving space 11 of the housing 10, the patient's height, size and width all can be obtained by calculating the position of the pressures applied on the sensors 30. Therefore, the therapeutic mattress of the present invention can use the sensors to get the precise data of the patient, such as height, size, and width.

Figure 5:
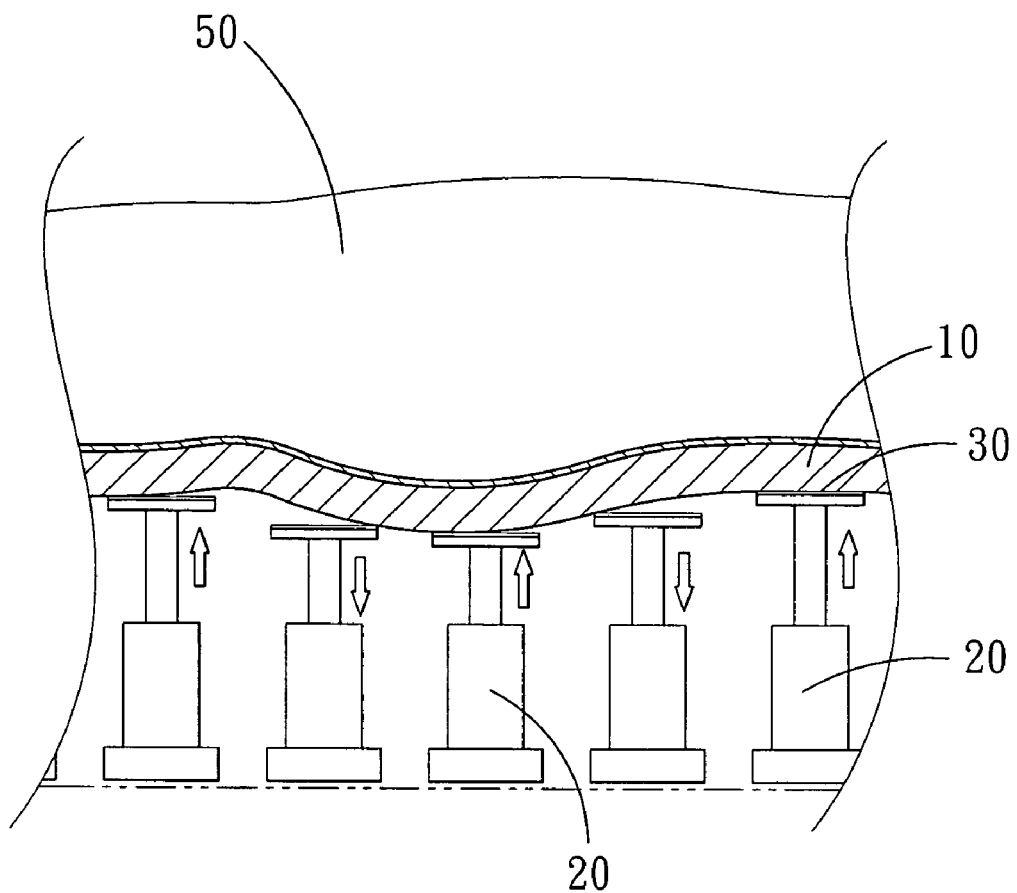
FIG. 5 is an operational view of a part of the therapeutic mattress in accordance with the present invention.

It will be noted that, as shown in FIG. 5, the patient 50 is supported totally by the lifting-and-supporting assemblies 20 that are located in the receiving space 11 of the mattress 10 under the control of the control system 40, so that the medical people can adjust the rise and fall of the respective lifting-and-supporting assemblies 20 based on the data collected by the control system 40 regarding the time and position of the pressure acted on the sensors 30, so as to constantly change the location of support on the body of the patient 50 (this can be done automatically under the control of the control system 40), so that the pressure will not be applied on the same position of the patient 50 for a long time, thus effectively preventing bedsores.

Figure 6:
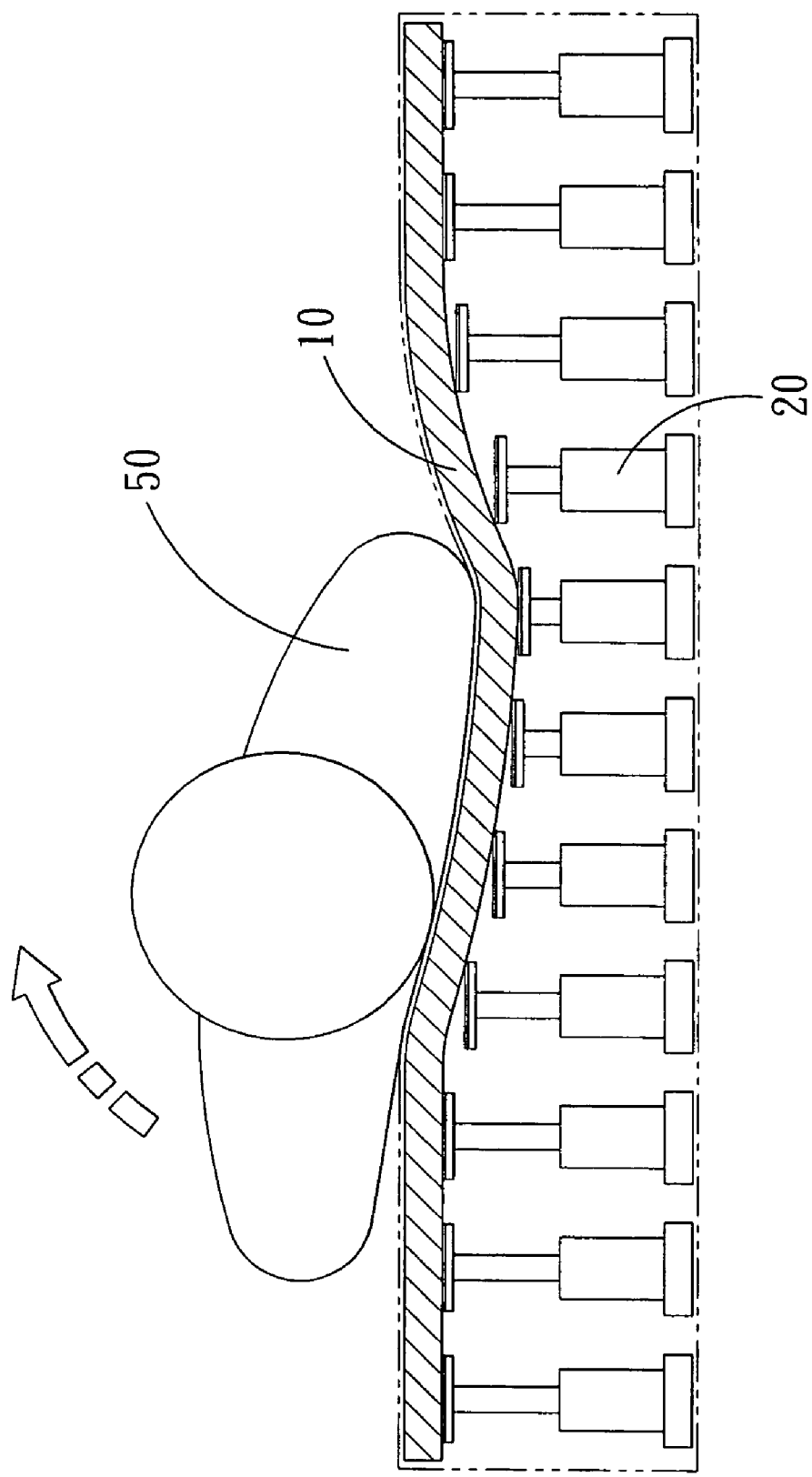
FIG. 6 shows the therapeutic mattress in accordance with the present invention is being adjusted to facilitate the patient turning over.

Refereeing to FIG. 6, to turn over the patient, the medical people can use the control system 40 to adjust the rise and fall operation of the respective lifting-and-supporting assemblies 20 as shown, in this way, the center of gravity of the patient 50 will be changed to make it easy to turn over (this also can be done automatically under control of a program, therefore, the medical people can turn over the patient 50 easily.

While we have shown and described various embodiments in accordance with the present invention, it should be clear to those skilled in the art that further embodiments may be made without departing from the scope of the present invention.

What is claimed is:

1. A therapeutic mattress comprising a housing, a plurality of lifting-and-supporting assemblies, a plurality of sensors and a control system, wherein;

the mattress is defined with a receiving space;

the plurality of lifting-and-supporting assemblies are arranged in the receiving space of the housing and the height of the respective lifting-and-supporting assemblies are adjustable, the lifting-and-supporting assemblies serve to stably support a patient lying on the housing;

the plurality of sensors are disposed between the lifting-and-supporting assemblies in the housing and serves to measure the weight of the patient lying on the lifting-and-supporting assemblies;

the control system serves to receive and process data sending from the respective sensors and provide result to medical people, the control system also serves to control the height of the respective lifting-and-supporting assemblies:

the sensors are piezo-electric elements and the lifting-and-supporting assemblies are in the form of a hydraulic pressure system.

* * * * *